United States Patent
Gendrin et al.

(10) Patent No.: US 6,827,374 B2
(45) Date of Patent: Dec. 7, 2004

(54) JUNCTION MEMBER FOR A HYDRAULIC CIRCUIT

(75) Inventors: Stéphane Gendrin, Bruz (FR); Pierre-Emmanuel Poirier, Saint-Gregoire (FR); Philippe Blivet, Rennes (FR)

(73) Assignee: Legris SA, Rênnes (FR)

( * ) Notice: Subject to any disclaimer, the term of this patent is extended or adjusted under 35 U.S.C. 154(b) by 0 days.

(21) Appl. No.: 10/472,150

(22) PCT Filed: Mar. 15, 2002

(86) PCT No.: PCT/FR02/00929

§ 371 (c)(1),
(2), (4) Date: Sep. 22, 2003

(87) PCT Pub. No.: WO02/075193

PCT Pub. Date: Sep. 26, 2002

(65) Prior Publication Data

US 2004/0070202 A1 Apr. 15, 2004

(30) Foreign Application Priority Data

Mar. 20, 2001 (FR) .......................................... 01 03751

(51) Int. Cl.[7] ........................... F16L 41/00; F16K 43/00
(52) U.S. Cl. ................. 285/126.1; 285/93; 285/133.11; 73/286; 73/861.04
(58) Field of Search ................................ 285/126.1, 93, 285/133.11, 129.1; 73/786, 715, 730, 861.04

(56) References Cited

U.S. PATENT DOCUMENTS

| | | | | |
|---|---|---|---|---|
| 3,530,839 A | * | 9/1970 | Avrea | 123/41.15 |
| 3,548,396 A | * | 12/1970 | Roberts | 340/595 |
| 3,625,065 A | * | 12/1971 | Thompson | 73/863.51 |
| 3,830,096 A | * | 8/1974 | Hirao et al. | 73/37.5 |
| 3,930,413 A | * | 1/1976 | Laird et al. | 73/863.85 |
| 3,934,605 A | * | 1/1976 | Legris | 137/271 |
| 4,539,998 A | * | 9/1985 | McCord et al. | 600/488 |
| 4,546,778 A | * | 10/1985 | Sullivan | 600/531 |
| 4,949,744 A | * | 8/1990 | Heed et al. | 137/15.15 |
| 5,404,905 A | * | 4/1995 | Lauria | 137/557 |
| 5,646,352 A | * | 7/1997 | Joseph et al. | 73/756 |
| 5,819,708 A | * | 10/1998 | Buratti et al. | 123/468 |
| 5,911,155 A | | 6/1999 | Webb | |
| 5,971,001 A | * | 10/1999 | Andersson | 137/15.12 |

FOREIGN PATENT DOCUMENTS

| | | |
|---|---|---|
| GB | 2 207 723 | 2/1989 |
| WO | WO 97 33118 | 9/1997 |

* cited by examiner

*Primary Examiner*—Eric K. Nicholson
(74) *Attorney, Agent, or Firm*—Young & Thompson

(57) ABSTRACT

A junction element for a hydraulic fluid circuit, comprising a body (1) which is provided with inner channels (2,3) leading in an outer direction through a plurality of connection elements (7,8,9,10) which can cooperate with outer channels and with the support (12) of at least one sensor (13) for the value of a physical parameter of the fluid circulating in one of the inner channels (2,3) of the body.

7 Claims, 2 Drawing Sheets

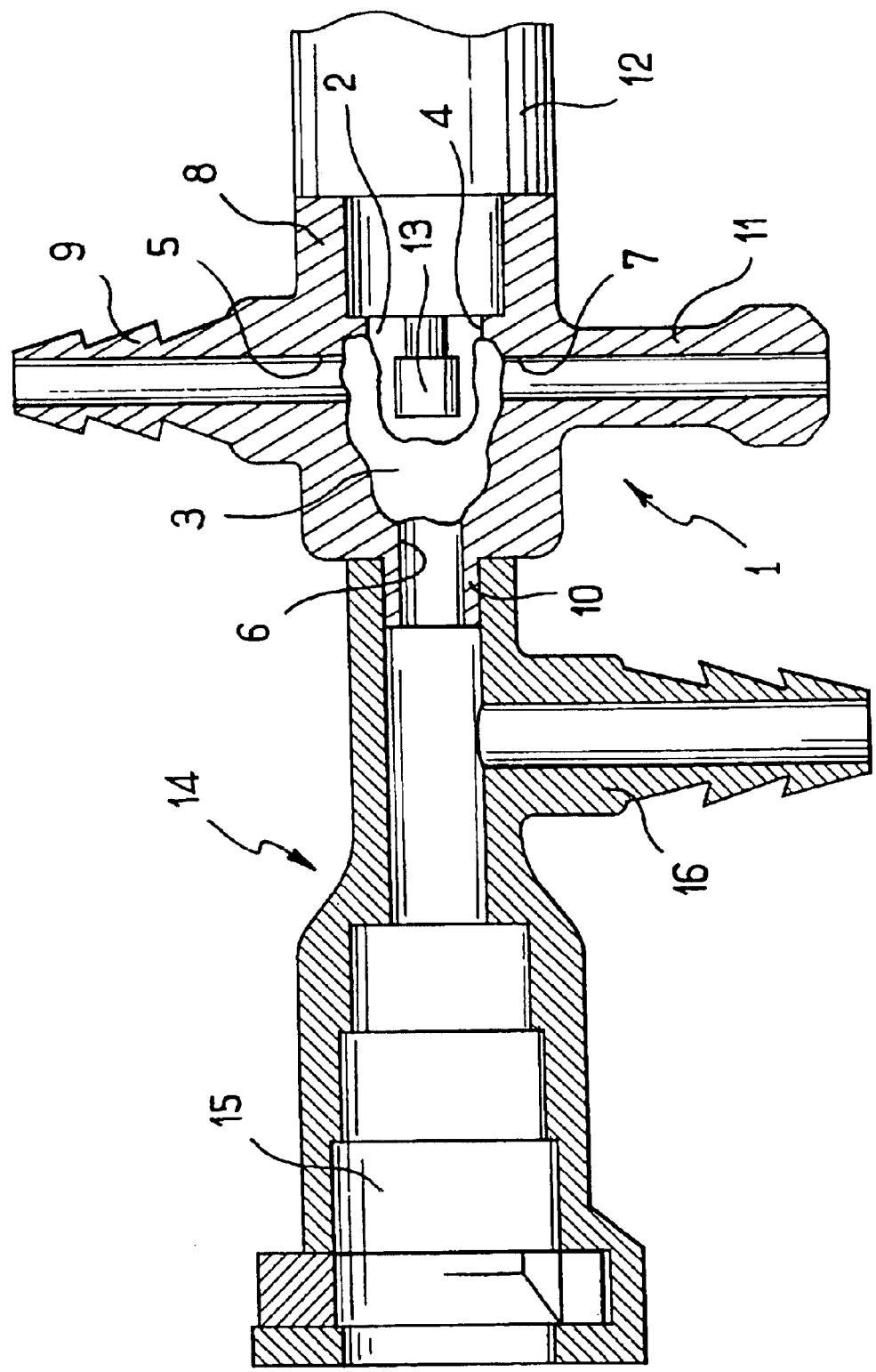
FIG_1

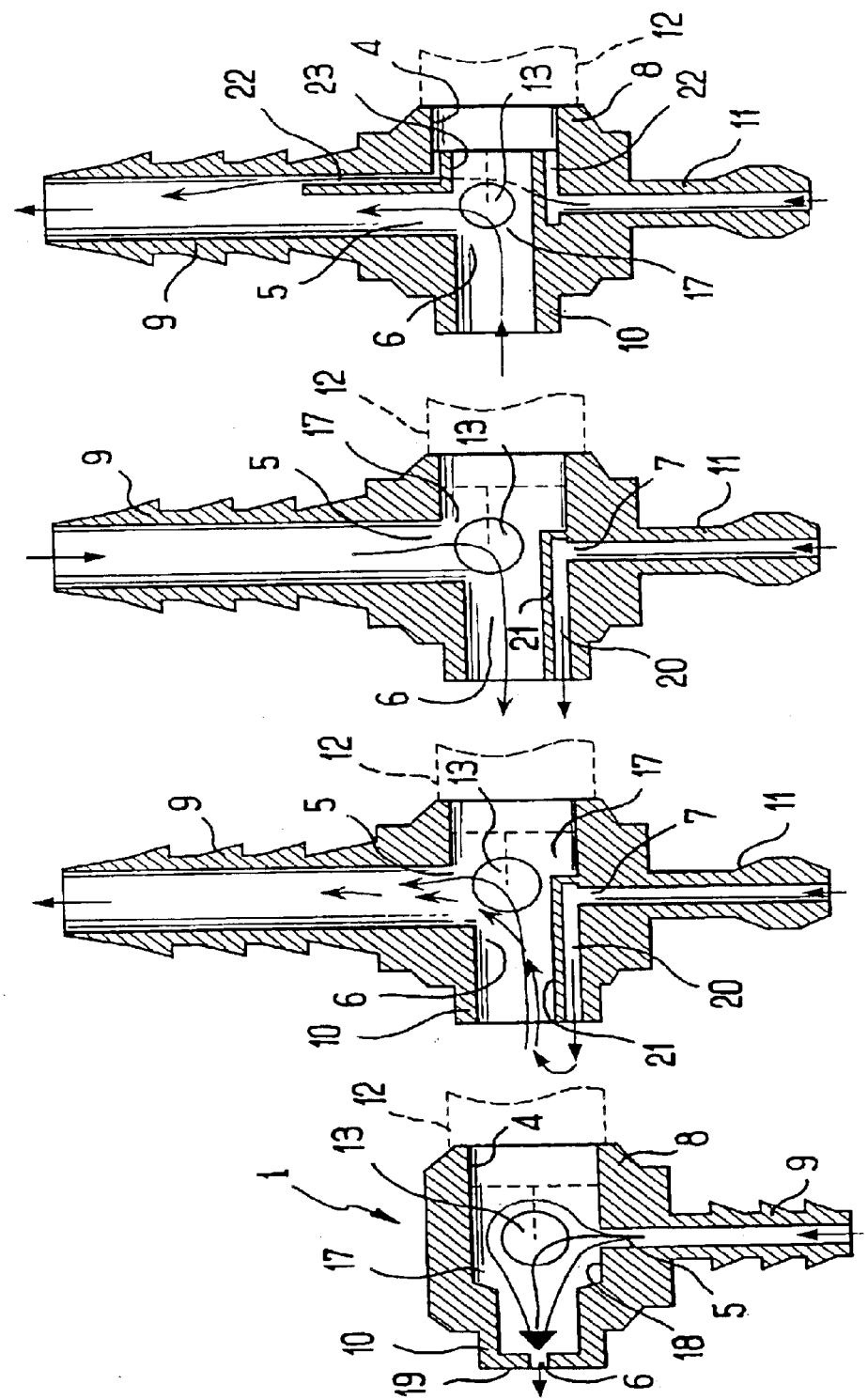

JUNCTION MEMBER FOR A HYDRAULIC CIRCUIT

CROSS REFERENCE TO RELATED APPLICATIONS

This is the 35 USC 371 National Stage of International Application PCT/FR02/00929 filed Mar. 15, 2002, which designated the United States of America.

FIELD OF THE INVENTION

Modern technology for managing the flow of fluids, in particular in a motor vehicle, implements numerous sensors enabling instantaneous parameter values such as the temperature of the fluid, its pressure, its viscosity, . . . , to be transmitted to one or more computers.

BACKGROUND OF THE INVENTION

It is thus necessary to equip at least some of the branches of a hydraulic circuit with such sensors, and thus to incorporate in the circuit supports that are suitable firstly to maintain the continuity of the circuit with regard to the fluid, and secondly to hold the sensitive portion of the sensor within the fluid to be monitored.

Each motor vehicle manufacturer has developed its own system for managing fluid flows, and those systems are generally similar from one vehicle to the other, but they are based on measurement points which, in reality, differ substantially from one vehicle to the other. Thus, with regard to the fuel circuit, for example, it is necessary to monitor the temperature of said fuel in the return pipe for returning excess fuel to the tank, which excess fuel comes from the injectors of the injection pump or even from the filter. In some systems, it suffices to know the temperature of the fuel coming from the injectors, others need to know the temperature of the fuel before its common return to the tank. Those different requirement require different mountings for the sensors that are to be put in place. Component manufacturers thus find it difficult to organize manufacture rationally in order to satisfy fully demand that is very diversified.

OBJECT AND SUMMARY OF THE INVENTION

The present invention seeks to remedy that difficulty, at least in part, by proposing a hydraulic-fluid circuit element having the function of grouping in one body the various pipes that might need to be fitted with a sensor so as to be able to rationalize the manufacture of the body which is to receive at least one sensor in unique manner.

More precisely, the invention provides a junction member for a hydraulic-fluid circuit which comprises a body provided with internal channels opening to the outside through a plurality of connection means capable of co-operating firstly with external pipes, and secondly with the support of at least one sensor for sensing a physical characteristic of the fluid flowing through one of the internal channels of the body.

An advantage of the junction member resides in the fact that it constitutes a single point of intervention on the fluid circuit, thereby making it easier to clean and maintain, in particular when the circuit has motor-vehicle fuel flowing therethrough.

Since the support for the sensor is in the form of a spigot having an end suitable for connection to an active sensor portion, the internal channels of the body of the junction member of the invention include a chamber having a wall that includes the connection means for connecting the support of the sensor in a position such that the active portion of said sensor is situated in the chamber. In this way, a unique interface is provided for positioning sensors, whatever the junctions that are to be made between the various fluid flows arriving or leaving the junction member of the invention.

The chamber is further defined in the body by a wall provided with at least two orifices each extended beyond the chamber by external connection means. This is the simplest embodiment of the invention, in which the active portion of a sensor is held in a single flow of fluid.

In another embodiment of the junction member of the invention, the body includes a third orifice passing through connection means for connecting to an external pipe, while the internal channels include at least one partitioning element for partitioning the chamber, said partitioning element defining, in said chamber, a bypass channel between two of the three above-mentioned orifices, so as to avoid the active portion of the sensor. The presence of the bypass channel enables the junction member of the invention to be used in several ways, depending on whether it is required to sense a parameter value for a single flow or for a mixture of flows.

Finally, it is advantageous for the connection between the body and the sensor support to be rotary, and for the means for connecting the body to the various external pipes to be situated in a plane containing the connection axis for connecting the support to the body.

BRIEF DESCRIPTION OF THE DRAWINGS

Other characteristics and advantages of the invention appear from the following description of some embodiments.

Reference is made to the accompanying drawings, in which:

FIG. 1 is a section view showing a general arrangement having multiple connections implementing the junction member of the invention;

FIGS. 2, 3, 4, and 5 are section views showing various possible embodiments of the body of the junction member of the invention.

DETAILED DESCRIPTION OF THE INVENTION

FIG. 1 shows a junction member of the invention which comprises a body 1 in which there is provided a system of internal channels 2 and 3 which are defined below, the system of internal channels opening out to the outside of the body 1 via orifices 4, 5, 6, 7, each formed in a respective connection member 8, 9, 10, 11. The connection member 8 is capable of co-operating with the support 12 of at least one sensor 13 for sensing a physical parameter (e.g. temperature) of the fluid flowing through the system of internal channels of the body 1. The connection member 9 is constituted by a spigot with christmas-tree shaped teeth capable of receiving, in known manner, the end of an external pipe. In this figure, the connection device 10 is provided so as to be fitted with a standard hydraulic circuit fitting, which forms a T-joint with, at one of its ends, means for coupling 15 with and locking to an appropriate spigot, and a T-branch 16 in a spigot with christmas-tree shaped teeth for engaging in an external pipe. Finally, the connection member 11 is a conventionally-shaped spigot having an enlarged end so as to receive a pipe which is secured thereon, in particular by means of a clamping collar.

This embodiment of the junction member of the invention can be the subject of numerous variants. In particular, the member 14 could be quite different and consist of a spigot that has christmas-tree shaped teeth or an enlarged end, for example; and it could be made integrally with the body 1.

The system of internal channels 2 and 3 in the body 1 can be embodied in various ways. In FIG. 2, it should be observed that the body 1 has only two connection members for connecting to external pipes, namely a spigot 9 with christmas-tree shaped teeth, and the member 10 to which the element 14 can be connected, for example. The internal channels consist of a chamber 17 which communicates with the outside via the orifices 4, 5, and 6, the orifice 4 being formed on one side of the chamber in a wall for receiving the support 12 for the sensor 13, the orifices 5 and 6 being formed in other walls 18, 19 of the chamber 17. It should be observed that the orifice 6 formed in the wall 19 constitutes a constriction restricting the flow of fluid coming from the orifice 5 and passing through the chamber 17. The constriction serves to isolate the flow coming from the orifice 5 from another flow, e.g. a flow coming from a pipe connected to the support 14 via the means 15 (see FIG. 1). The sum of the flows coming firstly from the orifice 5, and secondly from the connection 15, is evacuated in the direction of a gasoline tank if the fluid is fuel, for example, through the spigot 16 with christmas-tree shaped teeth of the T-shaped junction member 14. The body 1 in FIG. 2 therefore makes it possible to sense the temperature of only one of the flows, for example, thereby satisfying a particular user requirement.

If the requirement of the user is, for example, to know the temperature of two flows after they have been mixed, it suffices to provide the same body 1 as that shown in FIG. 1, with a bigger orifice 6 through the wall 19, and to receive, in the chamber 17, both flows after they have been mixed, the flows being conveyed to said chamber by means of the T-shaped member 14 in FIG. 1. The mixture is then evacuated in the opposite direction to that shown in FIG. 2, through the spigot 9 via the orifice 5.

In the case in FIG. 3, as with FIG. 1, the body 1 has a spigot 9 with christmas-tree shaped teeth and a spigot 11 having an enlarged end. The orifice 7 which passes through the spigot 11 opens out into a bypass channel 20 for avoiding the chamber portion 17 in which the sensor 13 is housed, said channel connecting the orifice 7 to the orifice 6. The bypass channel 20 is made by a partition 21 of the chamber 17.

With a body constituted in this way, there can be admitted into the chamber 17 a flow which comes from the mixture of the liquid penetrating into the body 1 via the orifice 7, and which is taken to the orifice 6 via the bypass channel 20 where it meets a flow entering into the body 1 via said orifice 6, which flow can itself be composite if the body 1 is associated with an element 14, as shown in FIG. 1. The value of the parameter which is sensed in the chamber 17 by the sensor 13 corresponds to a characteristic of the mixture of all the flows which exit via the orifice 5 passing through the spigot 9 with christmas-tree shaped teeth.

In FIG. 4, the body 1 shown is identical to the body in FIG. 3. It is simply used in a different way since two flows penetrate into the body 1, one via the orifice 5, the other via the orifice 7, and they are united as parallel flows at the orifice 6 so as to be evacuated either via a single spigot or via a T-junction in which, as with FIG. 1, there can be added to a flow penetrating via one or the other of the spigots 15 and 16 of the body 14. It should be understood that in these conditions, the body of the junction element of the invention enables information to be gathered on the physical parameter of only one of the flows in the hydraulic circuit to be managed.

Finally, in FIG. 5, it should be noted that the orifice 7 is extended by a bypass channel 22 formed in the body 1 by a partition 23 different from the chamber 17, which partition enables the orifice 7 to be connected to the orifice 5. In the present case, the support 12 of the sensor 13 participates in defining the bypass channel 22 which is an annular channel inside the chamber 17. It should be understood that in these conditions, the sensor 23 engages only in the flow of liquid penetrating into the body 1 via the orifice 6, and that full mixing of the two flows takes place beyond the chamber 17 in the direction of a gasoline tank, for example, connected to the spigot 9.

It may be advantageous to ensure that the connection between the support 12 and the connection means 8 of the body 1 is made rotary by any known means. In this case, all the other connections of the body 1 are advantageously situated in the same plane (e.g. the section plane of the figures) containing the axis about which the sensor support can rotate relative to the body 1. This disposition makes it easier to access the junction member, both hydraulically and electrically.

What is claimed is:

1. A junction member for a hydraulic-fluid circuit, the junction member comprising a body (1) provided with internal channels (2, 3) opening to the outside through a plurality of connection members (7, 8, 9, 10) capable of co-operating firstly with external pipes, and secondly with a support (12) of at least one sensor (13) for sensing a physical characteristic of the fluid flowing through one of the internal channels (2, 3) of the body, wherein the support (12) for the sensor (13) is in the form of a spigot having an end suitable for connection to an active sensor portion (13), and the internal channels of the body include a chamber (17) having a wall that includes the connection member (8) for connecting the support of the sensor in a position such that the active portion (13) of said sensor is situated in the chamber (17), wherein the body (1) includes a defining wall (18, 19) for defining the chamber (17), the wall being provided with at least two orifices (5, 6) each extended beyond the chamber (17) by connection members (9, 10) for connecting to an external pipe, and wherein the body (1) includes a third orifice (7) passing through connection member (11) for connecting to an external pipe, and in that the internal channels include a bypass channel (20) so as to avoid the active portion (13) of the sensor, and so as to connect the third orifice (7) to one (5, 6) of the other two orifices, said bypass channel being formed by a partitioning element for partitioning the chamber (17).

2. A junction member according to claim 1, characterized in that the connection (8) for connecting the body (1) to the sensor support (12) is a rotary connection.

3. A junction member according to claim 2, wherein the axes of the connection members (9, 10, 11) of the body are in a plane containing the axis of the connection (8) for connecting the sensor support (12) to the body (1).

4. A junction member for a hydraulic-fluid circuit, the junction member comprising a body provided with internal channels opening to the outside through a plurality of connection members capable of co-operating firstly with external pipes, and secondly with a support of at least one sensor for sensing a physical characteristic of the fluid flowing through one of the internal channels of the body, wherein said body includes a defining wall for defining a chamber, said wall being provided with at least two orifices each extended beyond the chamber by first and second ones of the connection members for connecting to an external pipe and with a third orifice passing through a third one of the connection members for connecting to an external pipe, and wherein the internal channels include a bypass channel formed by a partitioning element for partitioning the chamber so as to connect the third orifice to one of the other two orifices.

5. A junction member according to claim 4, wherein the support for the sensor is in the form of a spigot having an end suitable for connection to an active sensor portion, said wall of said chamber including a fourth one of the connection members for connecting the support of the sensor in a position such that the active portion of said sensor is situated in the chamber.

6. A junction member according to claim 5, wherein the connection for connecting the body to the sensor support is a rotary connection.

7. A junction member according to claim 6, wherein the axes of the connection members of the body are in a plane containing the axis of the connection for connecting the sensor support to the body.

* * * * *